(12) United States Patent
Kim et al.

(10) Patent No.: US 8,401,579 B2
(45) Date of Patent: Mar. 19, 2013

(54) METHOD AND APPARATUS FOR SYNCHRONIZING BROADCAST MESSAGE IN BROADBAND WIRELESS COMMUNICATION SYSTEM

(75) Inventors: Sung-Man Kim, Suwon-si (KR); Chang-Yeon Kim, Suwon-si (KR); Jun-Sung Lee, Seoul (KR); Hyo-Seon Oh, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 853 days.

(21) Appl. No.: 12/561,785

(22) Filed: Sep. 17, 2009

(65) Prior Publication Data

US 2010/0075592 A1    Mar. 25, 2010

(30) Foreign Application Priority Data

Sep. 19, 2008  (KR) .................. 10-2008-0092081

(51) Int. Cl.
*H04B 15/00* (2006.01)
(52) U.S. Cl. ............ 455/502; 455/63.1; 455/412.1; 455/501; 455/512; 455/524; 370/350; 370/352
(58) Field of Classification Search ............ 455/502, 455/3.01, 63.1, 324, 403, 412.1, 500, 501, 455/507, 512, 524, 526, 560, 561; 370/345, 370/350, 352
See application file for complete search history.

(56) References Cited

U.S. PATENT DOCUMENTS

2003/0235181 A1 * 12/2003 Semper et al. ................ 370/350

* cited by examiner

*Primary Examiner* — Shaima Q Aminzay
(74) *Attorney, Agent, or Firm* — Jefferson IP Law, LLP

(57) ABSTRACT

An apparatus and method for synchronizing a broadcast message in a broadband wireless communication system are provided. In a method of operating a Base Station (BS) for synchronizing the broadcast message in the broadband wireless communication system, the method includes setting a transmission start frame number of each of broadcast messages so that the transmission start frame number is identical to those of neighbor BSs according to a frame number generated based on Global Positioning System (GPS) information, if at least one or more of the broadcast messages are superposed in an $n^{th}$ frame, transmitting broadcast messages having a high priority among the at least one or more of the broadcast messages in the $n^{th}$ frame, and transmitting broadcast messages, having a low priority and not transmitted in the $n^{th}$ frame, in an $(n+1)^{th}$ frame with a time delay, and setting a next transmission start time of the broadcast messages having the high priority and the broadcast messages having the low priority to an $(n+m)^{th}$ frame, wherein n is an integer indicating a frame number for transmitting the broadcast messages, and m is an integer indicating a transmission period of a corresponding broadcast message.

20 Claims, 4 Drawing Sheets

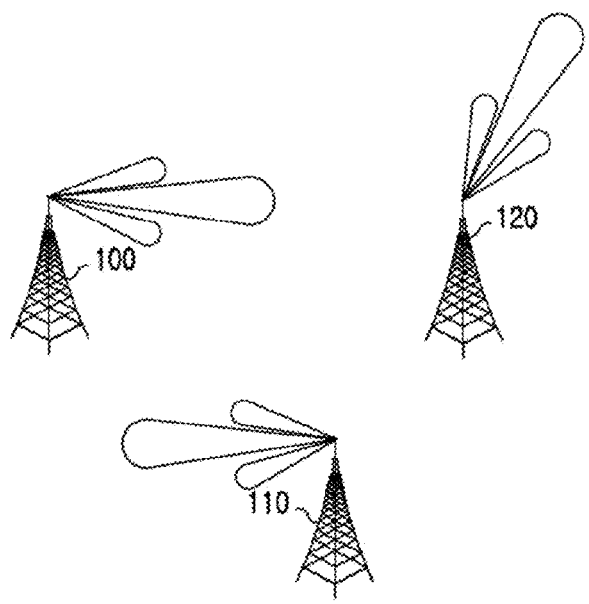
FIG.1A
(CONVENTIONAL ART)
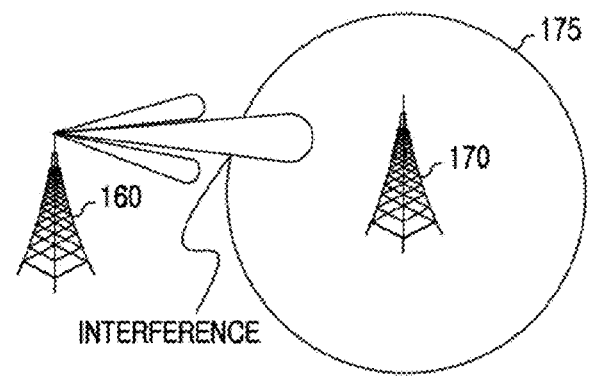
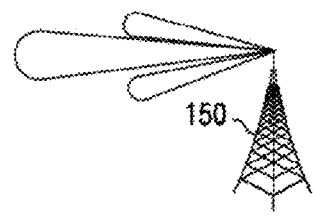
FIG.1B
(CONVENTIONAL ART)

METHOD AND APPARATUS FOR SYNCHRONIZING BROADCAST MESSAGE IN BROADBAND WIRELESS COMMUNICATION SYSTEM

PRIORITY

This application claims the benefit under 35 U.S.C. §119 (a) of a Korean patent application filed in the Korean Intellectual Property Office on Sep. 19, 2008 and assigned Serial No. 10-2008-0092081, the entire disclosure of which is hereby incorporated by reference.

BACKGROUND OF THE INVENTION

1. Field of the Invention

The present invention relates to a broadcast message in a broadband wireless communication system. More particularly, the present invention relates to a method and apparatus for synchronizing a broadcast message to minimize interference caused by beamforming.

2. Description of the Related Art

A mobile communication system has limited system performance and capacity due to a wireless channel property such as a Doppler effect, multi-path fading, and co-channel interference between cells or within the cells. A beamforming technique is one technique capable of increasing overall system capacity for solving issues of performance degradation. An example of a mobile communication system that implements the beamforming technique is a system based on the Institute of Electrical and Electronics Engineers (IEEE) 802.16 standard, which is hereafter referred to as an IEEE 802.16 system.

In the beamforming technique, a Base Station (BS) receives feedback of information regarding each wireless channel from each Mobile Station (MS) and forms a beam optimized for each MS. There are various types of beamforming techniques, and one of the most widely used beamforming techniques is zero-forcing beamforming.

FIG. 1A illustrates an example of beamforming in a conventional broadband wireless communication system.

Referring to FIG. 1A, each of BSs 100, 110, and 120 forms a beam. FIG. 1A illustrates an ideal case where all BSs simultaneously perform beamforming transmission without interfering with a neighbor BS. That is, each of the BSs 100, 110, and 120 multiplies downlink traffic to be transmitted to each MS with a beamforming coefficient so that a beam is formed in a direction of each MS. In the ideal case, beamforming is achieved by a zero-forcing algorithm while avoiding collision of beams in each of the BSs 100, 110, and 120.

While data messages may be transmitted from one BS to each MS, there may be broadcast messages (i.e., system information, etc.) that are simultaneously transmitted to all MSs located in a coverage of a specific BS. The data message to be transmitted to each MS may be transmitted by forming a beam according to a beamforming technique. However, the beamforming technique may not be used for a broadcast message which has to be received by all MSs. That is, the broadcast message has to be transmitted simultaneously in all directions as in the conventional method. When a broadcast message to which the beamforming technique is not applied and a data message transmitted using beamforming are simultaneously generated, severe interference may occur between a beamformed data message of a neighbor BS and the broadcast message to which beamforming is not applied.

FIG. 1B illustrates an example of beamforming and broadcasting in a conventional broadband wireless communication system.

Referring to FIG. 1B, each of BSs 150 and 160 are transmitting a data message transmitted using beamforming and BS 170 is transmitting a broadcast message in its cell coverage area 175 without using beamforming. Here, BSs 150 and 160 form beams by applying a beamforming coefficient to data to be transmitted to corresponding MSs, and BS 170 transmits a broadcast message to be received by all MSs in its cell coverage area 175. In this case, the BS 150 forms a beam in a direction different from a direction of the BS 170, and thus does not interfere with the BS 170. On the other hand, the BS 160 forms a beam in the same direction as the BS 170, and thus interferes with the BS 170.

As described above, a wireless communication system, such as an IEEE 802.16 system, has a problem due to the occurrence of interference resulting from broadcast messages being independently generated and transmitted in respective BSs. In addition, the occurrence of interference may result in a decrease of a cell throughput by 20~30%.

Therefore, a need exists for an apparatus and method to address interference caused by beamforming.

SUMMARY OF THE INVENTION

An aspect of the present invention is to address at least the above-mentioned problems and/or disadvantages and to provide at least the advantages described below. Accordingly, an aspect of the present invention is to provide an apparatus and method for synchronizing a broadcast message in a broadband wireless communication system.

In accordance with an aspect of the present invention, a method of operating a Base Station (BS) for synchronizing a broadcast message in a broadband wireless communication system is provided. The method includes setting a transmission start frame number of each of broadcast messages so that the transmission start frame number is identical to those of neighbor BSs according to a frame number generated based on Global Positioning System (GPS) information, if at least one or more of the broadcast messages are superposed in an $n^{th}$ frame, transmitting broadcast messages having a high priority among the at least one or more of the broadcast messages in the $n^{th}$ frame, transmitting broadcast messages, having a low priority and not transmitted in the $n^{th}$ frame, in an $(n+1)^{th}$ frame with a time delay, and setting a next transmission start time of the broadcast messages having the high priority and the broadcast messages having the low priority to an $(n+m)^{th}$ frame, wherein n is an integer indicating a frame number for transmitting the broadcast messages, and m is an integer indicating a transmission period of a corresponding broadcast message.

In accordance with another aspect of the present invention, a BS apparatus for synchronizing a broadcast message in a broadband wireless communication system is provided. The apparatus includes a frame number synchronizer for setting a transmission start frame number of each of broadcast messages so that the transmission start frame number is identical to those of neighbor BSs according to a frame number generated based on GPS information, a controller for, if at least one or more of the broadcast messages are superposed in an $n^{th}$ frame, transmitting broadcast messages having a high priority among the at least one or more of the broadcast messages in the $n^{th}$ frame, and for transmitting broadcast messages, having a low priority and not transmitted in the $n^{th}$ frame, in an $(n+1)^{th}$ frame with a time delay, and a period setting unit for setting a next transmission start time of the broadcast messages having the high priority and the broadcast messages having the low priority to an $(n+m)^{th}$ frame, wherein n is an integer indicating a frame number for transmitting the broadcast messages, and m is an integer indicating a transmission period of a corresponding broadcast message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 1A illustrates an example of beamforming in a conventional broadband wireless communication system;

FIG. 1B illustrates an example of beamforming and broadcasting in a conventional broadband wireless communication system;

Throughout the drawings, it should be noted that like reference numbers are used to depict the same or similar elements, features and structures.

DETAILED DESCRIPTION OF EXEMPLARY EMBODIMENTS

Figure 2:
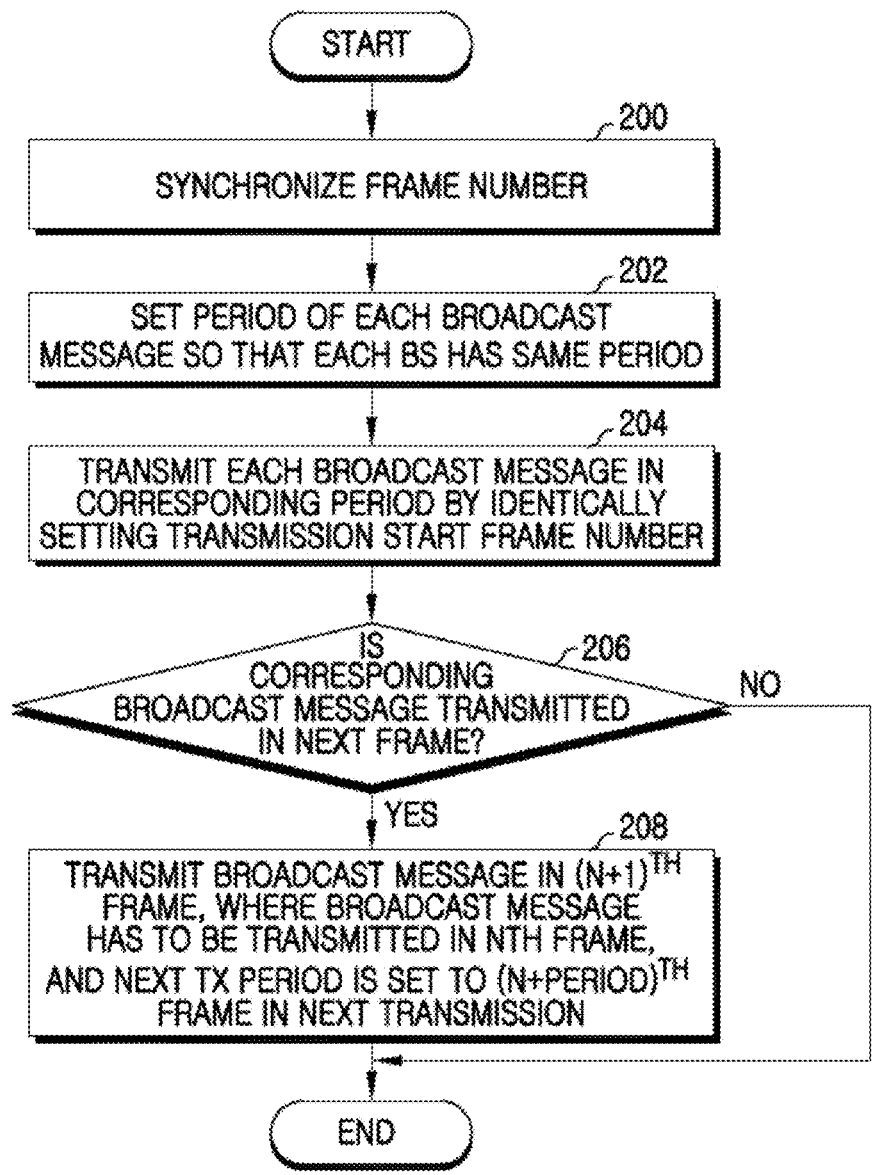
FIG. 2 is a flowchart illustrating an operation of a Base Station (BS) for synchronizing a broadcast message in a broadband wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, description of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention described below relate to a method and apparatus for synchronizing a broadcast message in a broadband wireless communication system.

In the following description, it is assumed that each Base Station (BS) generates broadcast messages according to a specific period or rule instead of randomly generating the broadcast messages.

Table 1 below shows broadcast message types used in the broadband wireless communication system.

TABLE 1

| Name | Description | | Periodic |
|---|---|---|---|
| UCD | UL channel descriptor | MAC message for describing physical feature of uplink | 1465 ms |
| DCD | DL channel descriptor | MAC message for describing physical feature of downlink | 1465 ms |
| MOB_TRF-IND | Traffic indication message | MAC message related to paging of MS in sleep mode | Positive*: from 320 + 40 ms to 5120 + 40 on the increase to double (320 + 40, 640 + 40, . . . , 5120 + 40). Negative*: Be equal to positive. |
| MOB_NBR-ADV | Neighbor advertisement message | MAC message for broadcasting information of neighbor BSs. | 2000 ms |
| MOB_PAG-ADV | BS broadcast paging message | MAC message related to paging of MS in idle mode. | Positive*: from 1280 to 163840 on the increase to double (1280, 2560, . . . , 163840). Negative: every 160 ms |
| SII-ADV | Service Identity broadcast | MAC message for information of service provider of core network. | 5000 ms |

The broadband messages shown in Table 1 are transmitted according to respective periods proposed therein. It is noted that the values of the periods may change when implemented. Downlink Channel Descriptor (DCD), Uplink Channel Descriptor (UCD), MOBile NeighBoR ADVertisement (MOB_NBR-ADV), and System Identify Information ADVertisement (SII-ADV) messages (hereinafter, referred to as extra broadcast messages) are broadcast according to a specific period. Paging-related messages (i.e., MOBile TRaFfic INDication (MOB_TRF-IND) and MOBile PAGing ADVertisement (MOB_PAG-ADV) messages) have a characteristic in that a listening window increases by two-fold according to a class of a sleep mode and a feature of an idle mode. Therefore, generation time generally increases by two-fold. Herein, positive paging denotes reporting of a presence of a paging message to be transmitted, and negative paging denotes reporting of an absence of the paging message to be transmitted.

Meanwhile, a priority may be assigned to each broadcast message by an operator or a scheduling algorithm. For example, extra broadcast messages which are not influenced by Transmit (Tx) timing have a lower priority than paging-related messages sensitive to the Tx timing.

FIG. 2 is a flowchart illustrating an operation of a BS for synchronizing a broadcast message in a broadband wireless communication system according to an exemplary embodiment of the present invention.

Referring to FIG. 2, the BS receives time information from a Global Positioning System (GPS) and synchronizes a frame number of a physical layer in step 200. That is, frame numbers of all BSs are set to the same number by using the time information. For example, the BS 100 of FIG. 1A uses a frame number 1, and the BS 110 and the BS 120 also use the same frame number 1.

In step 202, the BS sets a Tx period of each broadcast message so that the Tx period is identical to those of other neighbor BSs. In step 204, the BS transmits each broadcast message at a corresponding period. In this case, the BS sets a corresponding frame number of each broadcast message so that the frame number is identical to those of other BSs. For example, when the BS 100 broadcasts the broadcast messages described in Table 1 in an $n^{th}$ frame according to a specific period, the BSs 110 and 120 also broadcast corresponding broadcast messages in the $n^{th}$ frame. Therefore, each BS transmits its broadcast message at the same time point by using the same frame number.

In a method of setting the period of each broadcast message so that a BS has the same period as its neighbor BSs, a frame number at a current time point is divided by the period of each broadcast message and the broadcast message is transmitted when a remainder of the division operation is a specific constant value. For example, a broadcast message having a period of 5 frames and transmitted from a $7^{th}$ frame is transmitted in $7^{th}$, $12^{th}$, $17^{th}$, and $22^{nd}$ frames. In this case, a result of dividing the $7^{th}$, $12^{th}$, $17^{th}$, and $22^{nd}$ frames by the period of 5 is a specific constant value (i.e., 2). Therefore, when the constant value of 2 is obtained as a result of the division operation, the broadcast message is transmitted.

In step 206, the BS determines whether each broadcast message cannot be completely transmitted in a current frame at a corresponding period and thus it has to be transmitted in a next frame. Then, the procedure proceeds to step 208. In other words, since each broadcast message has a different period, several broadcast messages may be concentrated in one frame (i.e., an $N^{th}$ frame). In step 208, if a specific broadcast message is transmitted in a next frame (i.e., $(N+1)^{th}$ frame) according to a priority, a frame number for transmitting a next broadcast message is transmitted not in an $(N+1+period)^{th}$ frame but in an $(N+period)^{th}$ frame in order to synchronize the broadcast message. This will be described below with reference to FIGS. 3A and 3B.

Thereafter, the procedure of FIG. 2 ends.

Figure 3:
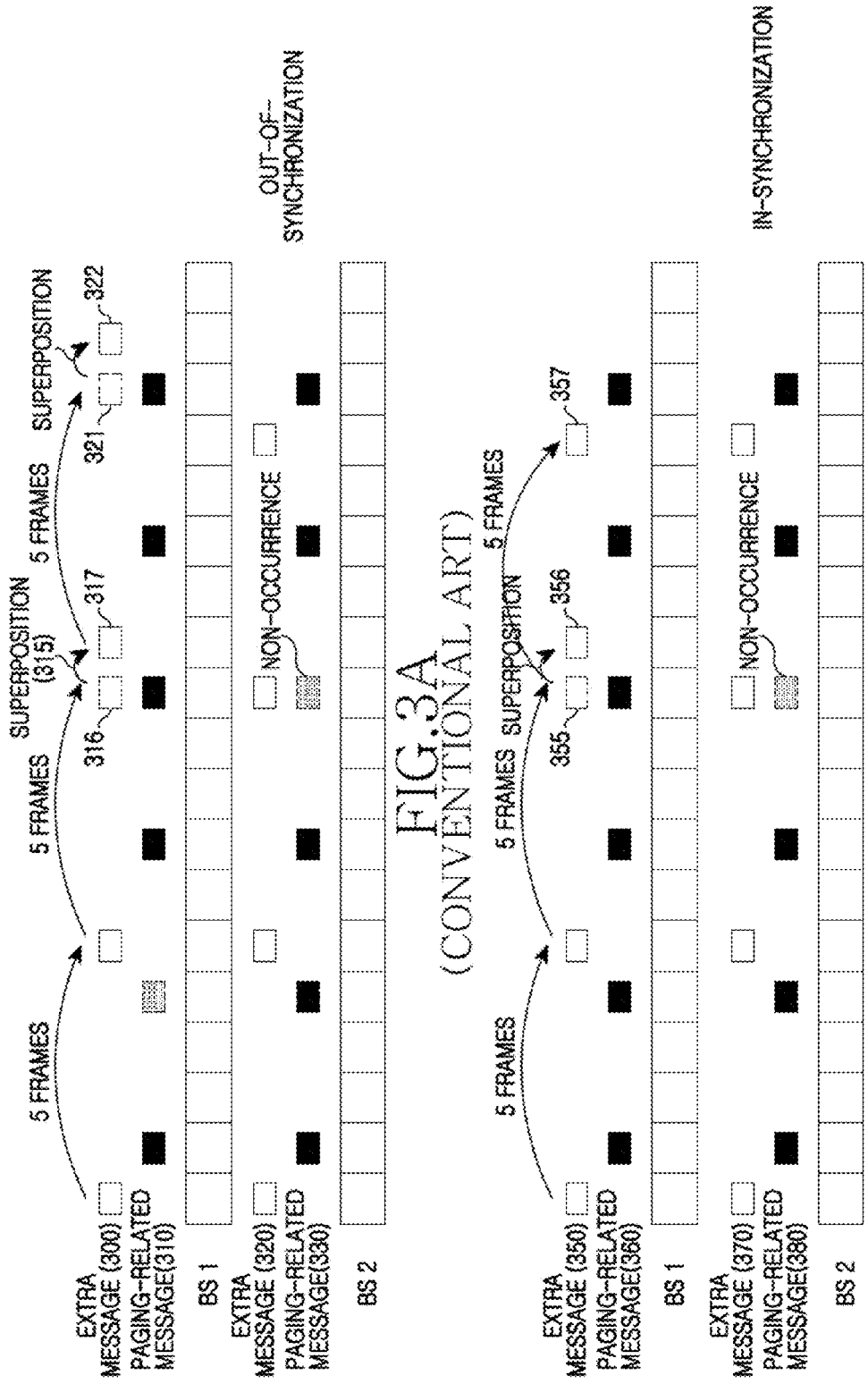
FIG. 3A illustrates an example of an out-of-synchronization broadcast message in a conventional broadband wireless communication system.
FIG. 3B illustrates an example of a synchronized broadcast message in a broadband wireless communication system according to an exemplary embodiment of the present invention.

FIG. 3A illustrates an example of an out-of-synchronization broadcast message in a conventional broadband wireless communication system.

Referring to FIG. 3A, a BS 1 and a BS 2 transmit extra broadcast messages (i.e., UCD, DCD, MOB_NBR-ADV, and SII-ADV) 300 and 320 at the same time point with a Tx period of 5 frames, and transmit paging-related broadcast messages (i.e., MOB_TRF-IND and MOB_PAG-ADV) 310 and 330 at the same time point with a Tx period of 3 frames. Herein, if the BS 1 has to transmit the extra broadcast messages 300 and the paging-related broadcast messages 310 in a frame 316 in a superposed fashion (as indicated by 315 in FIG. 3A), it is not possible to transmit all of the UCD, DCD, MOB_NBR-ADV, AND SII-ADV messages in the frame 316. Therefore, the UCD, DCD, MOB_NBR-ADV, and SII-ADV messages may be transmitted in a next frame 317 since a low priority is assigned to these messages. In the conventional broadband wireless communication system, after the messages having a low priority (i.e., UCD, DCD, MOB_NBR-ADV, and SII-ADV messages) are transmitted in the next frame 317, a Tx period is delayed by 5 frames from a Tx start time. That is, the extra broadcast messages 300 are transmitted in a frame 321. Since Tx start times of the extra broadcast messages 300 and the paging-related broadcast messages 310 are superposed again in the frame 321, the extra broadcast messages 300 are transmitted in a next frame 322 since a low priority is assigned to these messages. The priority may be determined according to a level of importance of the broadcast messages. For example, even if the UCD, DCD, MOB_NBR-ADV, and SII-ADV messages are transmitted in a next frame due to delay, it does not have much effect on system performance. On the other hand, when the MOB_TRF-IND and MOB_PAG-ADV messages are transmitted in a next frame due to delay, it may significantly decrease system performance. Therefore, the MOB_TRF-IND and MOB_PAG-ADV message are set to a higher priority than the UCD, DCD, MOB_NBR-ADV, and SII-ADV messages.

Meanwhile, the BS 2 transmits the extra broadcast messages (i.e., UCD, DCD, MOB_NBR-ADV, and SII-ADV) 320 with a Tx period of 5 frames at the same time point as the BS 1, and also transmits paging-related broadcast messages (i.e., MOB_TRF-IND and MOB_PAG-ADV) 330 with a Tx period of 3 frames at the same time point as the BS 1. However, this is a case where the BS 2 does not have to transmit the paging-related broadcast messages in the frame 316. In this case, the extra broadcast messages 320 are not superposed with the paging-related broadcast messages 330 in the frame 316 as in the BS 1. Therefore, the extra broadcast messages 320 are transmitted without being delayed to the next frame 317. The BS 2 does not transmit the paging-related broadcast message in the frame 316 since a listening window changes according to whether an MS operates in a sleep mode or an idle mode. For example, the PAG-ADV message is used to report whether traffic exists for the MS operating in the idle mode, and the TRF-IND message is used to report whether traffic exists for the MS operating in the sleep mode. When in the idle mode, the MS performs a handover, and thus the BS may not know the existence of the MS operating in the idle mode. Therefore, the PAG-ADV message should always be transmitted. When in the sleep mode, the MS may not perform the handover, and thus the BS can know of the existence of the MS operating in the sleep mode. Therefore, in a case of the TRF-IND message, if the MS operating in the sleep mode does not exist in the coverage of the BS, the message is not necessarily transmitted. In addition, if previously received PAG-ADV and TRF-IND messages do not have traffic for the MS, a Tx period of the PAG-ADV message or the TRF-IND message of the MS increases by two-fold, and thus it may be unnecessary to transmit these messages. That is, this is a case where the BS 2 does not have to transmit the TRF-IND message since there is no MS operating in the sleep mode or a case where the BS 2 does not transmit the PAG-ADV message or the TRF-IND message due to changes in Tx periods of the PAG-ADV message and the TRF-IND message.

Therefore, the extra broadcast messages having a low priority are transmitted in the frame 317 of the BS 1 and are also transmitted in the frame 322. A corresponding traffic is transmitted by using beamforming in the frame 317 and the frame 322 of the BS, resulting in out-of-synchronization.

FIG. 3B illustrates an example of a synchronized broadcast message in a broadband wireless communication system according to an exemplary embodiment of the present invention.

Referring to FIG. 3B, each BS transmits extra broadcast messages 350 and 370 with a Tx period of 5 frames at the same time point, and transmits paging-related broadcast messages 360 and 380 with a Tx period of 3 frames at the same time point. If a BS 1 has to transmit the extra broadcast messages 350 and the paging-related broadcast messages 360 in a frame 355 in a superposed fashion, transmission of all of the UCD, DCD, MOB_NBR-ADV, and SII-ADV messages in the frame 355 may not be possible. Therefore, the extra broadcast messages 350 are transmitted in a next frame 356 since a low priority is assigned to these messages. In this case, the extra broadcast messages 350 transmitted in the next frame 356 with a low priority do not have a Tx period which is delayed by 5 frames from a Tx start time of the frame 356. Although the extra broadcast messages 350 are not transmitted in an original Tx period (i.e., the frame 355), they are transmitted in a frame 357 which is delayed by 5 frames from the frame 355.

Meanwhile, a BS 2 transmits the extra broadcast messages (i.e., UCD, DCD, MOB_NBR-ADV, and SII-ADV) 370 with a Tx period of 5 frames at the same time point as the BS 1, and also transmits paging-related broadcast messages (i.e., MOB_TRF-IND and MOB_PAG-ADV) 380 with a Tx period of 3 frames at the same time point as the BS 1. This is a case where the BS 2 does not have to transmit the paging-related broadcast messages in the frame 355. In this case, the extra broadcast messages 350 are not superposed with the paging-related broadcast messages 360 in the frame 355 as in the BS 1. For example, this is case where the BS 2 does not have to transmit the TRF-IND message since there is no MS operating in the sleep mode at a Tx start time of the frame 355 or a case where the PAG-ADV message or the TRF-IND message are not transmitted due to changes in Tx periods of the PAG-ADV message and the TRF-IND message.

Although the BS 1 transmits a broadcast message and the BS 2 transmits traffic by using beamforming in the frame 355, the broadcast messages transmitted from the BS 1 and the BS 2 are in-synchronization in the frame 357.

In the examples of FIGS. 3A and 3B, the DCD, MOB_NBR-ADV, and SII-ADV messages are not transmitted in a corresponding frame but are transmitted in a next frame with a time delay. However, some broadcast messages among the DCD, MOB_NBR-ADV, and SII-ADV messages may be transmitted in a corresponding frame without being delayed to the next frame. In addition, although it has been described that the DCD, MOB_NBR-ADV, and SII-ADV messages are transmitted with the same period and also the PAG-ADV message and the TRF-IND message are transmitted with the same period, the PAG-ADV message and the TRF-IND message may be transmitted with a different period and the DCD, MOB_NBR-ADV, and SII-ADV messages may also be transmitted with a different period.

As described above, when several broadcast messages are superposed with one another, transmission of all of the broadcast messages in an $N^{th}$ frame may not be possible, a broadcast message not transmitted in a frame N is transmitted in a frame N+1, and thereafter a next Tx period is set to an $(N+period)^{th}$ frame instead of an $(N+1+period)^{th}$ frame. Therefore, the broadcast messages are synchronized and thus interference caused by beamforming can be reduced.

Figure 4:
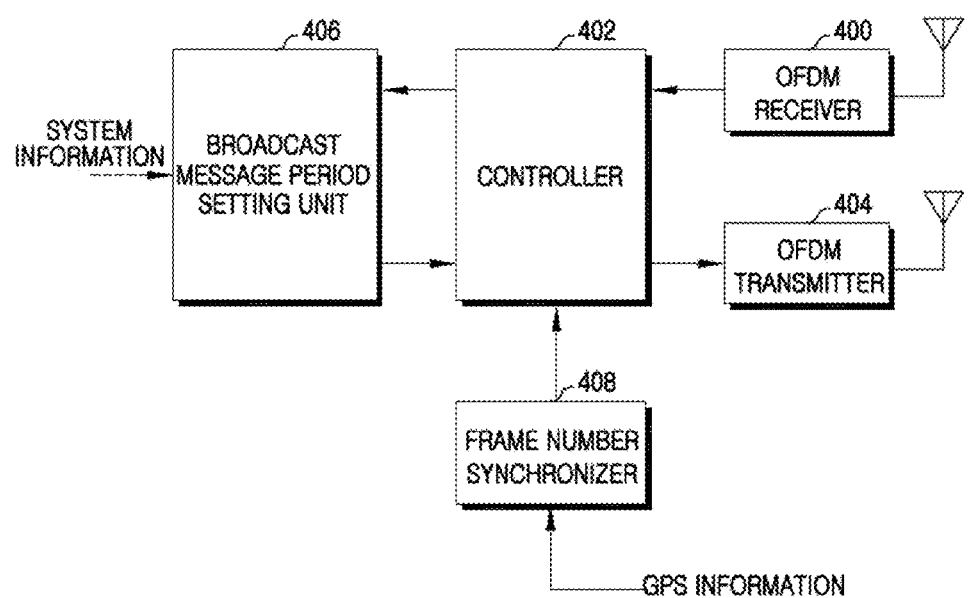
FIG. 4 is a block diagram illustrating a BS for synchronizing a broadcast message in a broadband wireless communication system according to an exemplary embodiment of the present invention.

FIG. 4 is a block diagram illustrating a BS for synchronizing a broadcast message in a broadband wireless communication system according to an exemplary embodiment of the present invention.

Referring to FIG. 4, the BS includes an Orthogonal Frequency Division Multiplexing (OFDM) receiver 400, a controller 402, an OFDM transmitter 404, a broadcast message period setting unit 406, and a frame number synchronizer 408.

The OFDM receiver 400 down-converts a Radio Frequency (RF) signal received through an antenna into a baseband analog signal, and converts the analog signal into a digital signal. Further, the OFDM receiver 400 converts a time-domain signal into a frequency-domain signal by performing Fast Fourier Transform (FFT). The OFDM receiver 400 selects data of to-be-received sub-carriers from frequency-domain data, and demodulates and decodes the selected data according to a preset Modulation and Coding Scheme (MCS) level.

The OFDM transmitter 404 codes and modulates a signal received from the controller 402 according to the preset MCS level, and converts a frequency-domain signal into a time-domain sample signal by performing Inverse FFT (IFFT). Further, the OFDM transmitter 404 converts the sample signal into an analog signal. Furthermore, the OFDM transmitter 404 converts a base-band signal into an RF signal, and transmits the RF signal through an antenna.

The OFDM receiver 400 and the OFDM transmitter 404 operate by using a Frequency Division Duplex (FDD) scheme or a Time Division Duplex (TDD) scheme. The broadcast message period setting unit 406 uses system information and broadcast message-related information provided from the controller 402 to set a Tx period of each broadcast message so that the Tx period is identical to those of other neighbor BSs. For example, when the BS 100 of FIG. 1A broadcasts the broadcast messages described in Table 1 above in an $(n+period)^{th}$ frame according to a specific period, the BSs 110 and 120 also broadcast corresponding broadcast messages in the $(n+period)^{th}$ frame. Therefore, each BS transmits its broadcast message at the same time point by using the same frame number.

The frame number synchronizer 408 receives visual information from a Global Positioning System (GPS) to synchronize a frame number of a physical layer, and provides synchronization information to the controller 402. The visual information is used to synchronize the frame number of all BSs.

The controller 402 provides overall control to the BS. According to an exemplary embodiment of the present invention, the controller 402 receives broadcast message period information from the broadcast message period setting unit 406 and synchronization information from the frame number synchronizer 408, and transmits the broadcast message in a corresponding frame. In particular, each broadcast message may not be fully transmitted at a corresponding period in a current frame and thus has to be transmitted in a next frame. That is, since each broadcast message has a different period, several broadcast messages may be concentrated in one frame (i.e., an $N^{th}$ frame). In this case, if a specific broadcast message is transmitted in a next frame (i.e., $(N+1)^{th}$ frame) according to a priority, a frame number for transmitting a next broadcast message is transmitted not in an $(N+1+period)^{th}$ frame but in an $(N+period)^{th}$ frame in order to synchronize the broadcast message.

In the aforementioned structure, the controller 402 is used as a protocol controller, and controls the broadcast message period setting unit 406 and the frame number synchronizer 408. That is, the controller 402 may perform functions of the broadcast message period setting unit 406 and the frame number synchronizer 408. Although the controller 402, broadcast message period setting unit 406 and frame number synchronizer 408 are described above separately configured, this is only for distinguishing their functions.

According to exemplary embodiments of the present invention, a broadband wireless communication system synchronizes a broadcast message to minimize interference between a data message to which beamforming is applied and broadcast messages to which beamforming is not applied. In addition, cell throughput deterioration caused by interference can be prevented.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a Base Station (BS) for synchronizing a broadcast message in a broadband wireless communication system, the method comprising:
   setting a transmission start frame number of each of broadcast messages so that the transmission start frame number is identical to those of neighbor BSs according to a frame number generated based on Global Positioning System (GPS) information;
   if at least one or more of the broadcast messages are superposed in an $n^{th}$ frame, transmitting broadcast messages having a high priority among the at least one or more of the broadcast messages in the $n^{th}$ frame, and transmitting broadcast messages, having a low priority and not transmitted in the $n^{th}$ frame, in an $(n+1)^{th}$ frame with a time delay; and
   setting a next transmission start time of the broadcast messages having the high priority and the broadcast messages having the low priority to an $(n+m)^{th}$ frame,
   wherein n is an integer indicating a frame number for transmitting the broadcast messages, and m is an integer indicating a transmission period of a corresponding broadcast message.

2. The method of claim 1, wherein the transmission start time of the broadcast message is determined to be a constant value when the frame number for transmitting the broadcast message is divided by the number of frames corresponding to the transmission period.

3. The method of claim 1, wherein the transmitting of the broadcast messages having a high priority among the at least one or more of the broadcast messages in the $n^{th}$ frame and the transmitting of the broadcast messages, having a low priority and not transmitted in the $n^{th}$ frame, in an $(n+1)^{th}$ frame with a time delay comprises:
   classifying the at least one or more of the broadcast messages into paging-related broadcast messages having a high priority and non-paging-related broadcast messages having a low priority;
   allowing the paging-related messages to be included in the $n^{th}$ frame;
   determining whether at least one of the non-paging-related broadcast messages are included in the $n^{th}$ frame including the paging-related messages;
   transmitting at least one of the non-paging-related broadcast messages by including the messages in the $n^{th}$ frame together with the paging-related messages; and
   transmitting a non-paging-related broadcast message, not transmitted in the $n^{th}$ frame among the non-paging-related broadcast messages, in an $(n+1)^{th}$ frame.

4. The method of claim 3, wherein the paging-related broadcast message comprises one of a MOBile TRaFfic INDication (MOB_TRF-IND) message and a MOBile PAGing ADVertisement message (MOB_PAG-ADV) message.

5. The method of claim 3, wherein the non-paging-related broadcast message comprises one of an Uplink Channel Descriptor (UCD) message, a Downlink Channel Descriptor (DCD) message, a System Identify Information ADVertisement (SII-ADV) message, and a MOBile NeighBoR ADVertisement (MOB_NBR-ADV) message.

6. The method of claim 1, wherein the transmitting of the broadcast messages having a high priority among the at least one or more of the broadcast messages in the $n^{th}$ frame and the transmitting of the broadcast messages, having a low priority and not transmitted in the $n^{th}$ frame, in an $(n+1)^{th}$ frame with a time delay comprises:
   classifying the at least one or more of the broadcast messages into paging-related broadcast messages having a high priority and non-paging-related broadcast messages having a low priority;
   transmitting the paging-related messages by including the messages in the $n^{th}$ frame; and
   transmitting the non-paging-related messages by including the messages in an $(n+1)^{th}$ frame.

7. The method of claim 6, wherein the paging-related broadcast message comprises one of a MOBile TRaFfic INDication (MOB_TRF-IND) message and a MOBile NeighBoR ADVertisement (MOB_PAG-ADV) message.

8. The method of claim 6, wherein the non-paging-related broadcast message comprises one of a Uplink Channel Descriptor (UCD) message, a Downlink Channel Descriptor (DCD) message, a System Identify Information ADVertisement (SII-ADV) message, and a MOBile NeighBoR ADVertisement (MOB_NBR-ADV) message.

9. The method of claim 1, further comprising setting a transmission period of each broadcast message so that the transmission period is equal to those of the neighbor BSs.

10. The method of claim 1, further comprising classifying the broadcast messages as being one of high priority and low priority depending on a degree to which a delay of their transmission affects system perform.

11. A Base Station (BS) apparatus for synchronizing a broadcast message in a broadband wireless communication system, the apparatus comprising:
   a frame number synchronizer for setting a transmission start frame number of each of broadcast messages so that the transmission start frame number is identical to those of neighbor BSs according to a frame number generated based on Global Positioning System (GPS) information;
   a controller for, if at least one or more of the broadcast messages are superposed in an $n^{th}$ frame, transmitting broadcast messages having a high priority among the at least one or more of the broadcast messages in the $n^{th}$ frame, and for transmitting broadcast messages, having a low priority and not transmitted in the $n^{th}$ frame, in an $(n+1)^{th}$ frame with a time delay; and a period setting unit for setting a next transmission start time of the broadcast messages having the high priority and the broadcast messages having the low priority to an $(n+m)^{th}$ frame, wherein n is an integer indicating a frame number for transmitting the broadcast messages, and m is an integer indicating a transmission period of a corresponding broadcast message.

12. The apparatus of claim 11, wherein the transmission start time of the broadcast message is determined to be a constant value when the frame number for transmitting the broadcast message is divided by the number of frames corresponding to the transmission period.

13. The apparatus of claim 11, wherein the controller classifies the at least one or more of the broadcast messages into paging-related broadcast messages having a high priority and non-paging-related broadcast messages having a low priority, allows the paging-related messages to be included in the $n^{th}$ frame, determines whether at least one of the non-paging-related broadcast messages are included in the $n^{th}$ frame including the paging-related messages, transmits at least one of the non-paging-related broadcast messages by including the messages in the $n^{th}$ frame together with the paging-related messages, and transmits a non-paging-related broadcast message, not transmitted in the $n^{th}$ frame among the non-paging-related broadcast messages, in an $(n+1)^{th}$ frame.

14. The apparatus of claim 13, wherein the paging-related broadcast message comprises one of a MOBile TRaFfic INDication (MOB_TRF-IND) message and a MOBile PAGing ADVertisement message (MOB_PAG-ADV) message.

15. The apparatus of claim 13, wherein the non-paging-related broadcast message comprises one of an Uplink Channel Descriptor (UCD) message, a Downlink Channel Descriptor (DCD) message, a System Identify Information ADVertisement (SII-ADV) message, and a MOBile NeighBoR ADVertisement (MOB_NBR-ADV) message.

16. The apparatus of claim 11, wherein the controller classifies the at least one or more of the broadcast messages into paging-related broadcast messages having a high priority and non-paging-related broadcast messages having a low priority, transmits the paging-related messages by including the messages in the $n^{th}$ frame, and transmits the non-paging-related messages by including the messages in an $(n+1)^{th}$ frame.

17. The apparatus of claim 16, wherein the paging-related broadcast message comprises one of a MOBile TRaFfic INDication (MOB_TRF-IND) message and a MOBile NeighBoR ADVertisement (MOB_PAG-ADV) message.

18. The apparatus of claim 16, wherein the non-paging-related broadcast message comprises one of a Uplink Channel Descriptor (UCD) message, a Downlink Channel Descriptor (DCD) message, a System Identify Information ADVertisement (SII-ADV) message, and a MOBile NeighBoR ADVertisement (MOB_NBR-ADV) message.

19. The apparatus of claim 11, wherein the period setting unit sets a transmission period of each broadcast message so that the transmission period is equal to those of the neighbor BSs.

20. The method of claim 11, wherein the broadcast messages are classified as being one of high priority and low priority depending on a degree to which a delay of their transmission affects system perform.

* * * * *